US 6,620,756 B2

(12) United States Patent
Mah et al.

(10) Patent No.: US 6,620,756 B2
(45) Date of Patent: Sep. 16, 2003

(54) CERAMIC MATRIX COMPOSITE CUTTING TOOL MATERIAL

(75) Inventors: Tai-Il Mah, Centerville, OH (US); Triplicane A. Parthasarathy, Beavercreek, OH (US); Michael K. Cinibulk, Bellbrook, OH (US)

(73) Assignee: UES, Inc., Dayton, OH (US)

( * ) Notice: Subject to any disclaimer, the term of this patent is extended or adjusted under 35 U.S.C. 154(b) by 140 days.

(21) Appl. No.: 09/885,214

(22) Filed: Jun. 20, 2001

(65) Prior Publication Data

US 2002/0198095 A1 Dec. 26, 2002

(51) Int. Cl.$^7$ .................. C04B 35/505; C04B 35/117
(52) U.S. Cl. ................... 501/152; 501/87; 501/89; 501/93; 501/95.3; 501/96.3; 501/127; 407/119
(58) Field of Search ................ 501/127, 152, 501/87, 89, 93, 95.3, 96.3; 407/119

(56) References Cited

U.S. PATENT DOCUMENTS

| | | | |
|---|---|---|---|
| 4,490,319 A | | 12/1984 | Lee et al. |
| 4,611,400 A | | 9/1986 | Drake |
| 4,701,384 A | | 10/1987 | Sarin et al. |
| 4,818,635 A | | 4/1989 | Exstrom et al. |
| 4,880,755 A | | 11/1989 | Mehrotra et al. |
| 5,177,037 A | | 1/1993 | Schuldies |
| 5,231,060 A | | 7/1993 | Brandt |
| 5,370,716 A | | 12/1994 | Mehrotra et al. |
| 5,382,273 A | | 1/1995 | Mehrotra et al. |
| 5,484,752 A | * | 1/1996 | Waku et al. ............ 501/127 |
| 5,569,547 A | * | 10/1996 | Waku et al. ............ 501/127 |
| 5,631,200 A | | 5/1997 | Ukegawa et al. |
| 5,902,763 A | * | 5/1999 | Waku et al. ............ 501/127 |
| 5,914,286 A | | 6/1999 | Collin et al. |
| 5,981,415 A | * | 11/1999 | Waku et al. ............ 501/80 |
| 6,326,076 B1 | * | 12/2001 | Takai ...................... 501/127 |
| 6,383,964 B1 | * | 5/2002 | Nakahara et al. ...... 501/152 |

OTHER PUBLICATIONS

K. Keller, T. Mah, and T.A. Parthasarathy; Processing and Mechanical Properties of Polycrystalline Y3AL5O12 (Yttrium Aluminum Garnet); Ceram. Eng. Sci. Proc.; 1990; 1122–1133. No Month.

S.G. Malghan, P. Pei, and P.S. Wang; Interface Chemistry of Silicon Carbide Platelets During Alumina Coating; Ceram. Eng. Sci. Proc.; 1991; 2115–2123. No Month.

E. Liden, L. Bergstrom, M Persson and R. Carlsson; Surface Modification and Dispersion of Silicon Nitride and Silicon Carbide Powders; Journal of the European Ceramic Society; 1991; 361–368; Elsevier Science Publishers Ltd, England. No Month.

B.M. Kramer, D. Viens, S. Chin; Theoretical Consideration of Rare Earth Metal Compounds as Tool Materials for Titanium Machining; Annals of the CIRP; 1993; 111–114; vol. 42.

(List continued on next page.)

*Primary Examiner*—Karl Group
(74) *Attorney, Agent, or Firm*—Kilworth, Gottman, Hagan & Schaeff, LLP

(57) ABSTRACT

A reinforcing material is uniformly dispersed in a yttrium aluminum garnet matrix material for use as a machine tool material specially suited for machining Ti or a Ti alloy. The matrix material and the reinforcing material are present in proportions selected such that the machine tool material is substantially resistant to transfer of impurities to a Ti or Ti alloy by way of either chemical reaction with or diffusion into the Ti or Ti alloy material to be machined. The matrix material preferably comprises $Y_3Al_5O_{12}$. The reinforcing material may comprise $SiC_w$, TiC, TiN, $TiB_2$, or combinations thereof and is preferably present in an amount sufficient to enable electrical discharge machining of the machine tool material. In addition, the machine tool material defines a thermodynamically stable phase at relatively high machining temperatures.

25 Claims, 3 Drawing Sheets

OTHER PUBLICATIONS

T. Mah, P.R. Subramanian, and L.E. Matson; Solid State Reactions Between Selected Intermetallics and Oxides in the AL–Y–O System; Scripta Metallurgica; 1993; 961–966; vol. 28; Pergamon Press Ltd.; USA. No Month.

G.S. Corman; Creep of yttrium aluminum garnet single crystals; Journal of Materials Science Letters; 1993; 397–382; General Electric Company; Schenectady, NY. No Month.

Triplicane A. Parthasarathy, Tai–Il Mah, and Kristen Keller; Creep Mechanism of Polycrystilline Yttrium Aluminum Garnet; Journal of the American Ceramic Society; 1992; 1756–1759; vol. 75, No. 7. No Month.

Tai–Il Mah, Kristen A. Keller, Sankar Sambasivan and Ronald J. Kerans; High–Temperature Environmental Stability of the Compounds in the AL2O3–Y2O3 System; Journal of the American Ceramic Society; 1997; 874–878; vol. 80, No. 4. No Month.

Tai–Il Mah and Triplicane A. Parthasarathy; Effects of Temperature, Environment, and Orientation on the Fracture Toughness of Single–Crystal YAG; Journal of the American Ceramic Society; 1997; 2730–2734; vol. 80. No Month.

* cited by examiner

CERAMIC MATRIX COMPOSITE CUTTING TOOL MATERIAL

STATEMENT REGARDING FEDERALLY SPONSORED RESEARCH OR DEVELOPMENT

This invention was made with government support under Contract No. DMI-9860390 awarded by the National Science Foundation. The Government has certain rights in this invention.

BACKGROUND OF THE INVENTION

The present invention relates to machine tool design, fabrication and, more specifically, to the composition and microstructure of a specialized material for machining titanium or a titanium alloy.

Titanium alloys are widely used in the aerospace industry because of their superior mechanical properties. Unfortunately, titanium and titanium alloys are very difficult to machine. In fact, the machinability of these materials has become the most significant process limitation in manufacturing many aerospace related components.

Typically, titanium and titanium alloys cannot be machined at high cutting speeds (>200 m/sec) because they have low thermal conductivity and high work-hardening characteristics. As a result, cutting temperatures typically rise rapidly to 1100° C., even at low cutting speeds (<50 m/min) and associated production is time consuming and costly.

Many ceramic machining materials have proven to be ineffective in machining titanium or titanium alloys because of their high degree of reactivity with titanium. As a result, there are few viable alternatives to conventional cemented carbide machine tool materials for titanium or titanium alloy machining and there is a continuing need for a material that may be utilized to achieve effective, high speed machining of titanium or titanium alloys.

BRIEF SUMMARY OF THE INVENTION

This need is met by the present invention wherein a machine tool material is provided comprising a yttrium aluminum garnet matrix material and a reinforcing material uniformly dispersed in the matrix material. In accordance with one embodiment of the present invention, a machine tool material is provided comprising a matrix material and a reinforcing material. The matrix material comprises a yttrium aluminum garnet (YAG). The reinforcing material is uniformly dispersed in the matrix material. The matrix material and the reinforcing material are present in proportions selected such that the machine tool material is substantially resistant to transfer of impurities to Ti or a Ti alloy, by way of either chemical reaction with or diffusion into the Ti or Ti alloy material to be machined. The matrix material preferably comprises $Y_3Al_5O_{12}$. The reinforcing material may comprise $SiC_w$, TiC, TiN, $TiB_2$, or combinations thereof.

The matrix material and the reinforcing material are preferably present in proportions selected such that the machine tool material is resistant to the transfer of impurities through chemical reaction with or dissolution into Ti or a Ti alloy. Preferably, the machine tool material is characterized by a low solubility in Ti, or a Ti alloy and defines a thermodynamically stable phase at temperatures up to about 1200° C.

The reinforcing material preferably comprises a material present in a proportion selected to enhance the characteristic electrical conductivity of the machine tool material and enable electrical discharge machining of the machine tool material. The reinforcing material is also preferably provided to enhance the hardness and the fracture toughness of the matrix material. By way of illustration and not by way of limitation, it is noted that measured properties of a sample material yielded flexural strength values of about 650 to about 750 MPa and fracture toughness values of about 4.15 to about 4.2 MPa($m^{1/2}$) and about 5.45 to about 5.5 MPa ($m^{1/2}$).

In accordance with another embodiment of the present invention, a machine tool material is provided comprising a matrix material and a reinforcing material. The matrix material comprises a yttrium aluminum garnet and the reinforcing material comprises a material present in proportions selected to enhance the characteristic electrical conductivity of the machine tool material. Preferably, the electrical conductivity is enhanced to an extent sufficient to enable electrical discharge machining of the machine tool material.

In accordance with yet another embodiment of the present invention, a machine tool is configured to cause frictional engagement of a workpiece and a workpiece machining element as the workpiece and the machining element move relative to one another. The workpiece machining element is formed of a machine tool material comprising a matrix material and a reinforcing material. The matrix material comprises a yttrium aluminum garnet. The reinforcing material is uniformly dispersed in the matrix material. The matrix material and the reinforcing material are present in proportions selected such that the machine tool material is substantially resistant to transfer of impurities through chemical reaction with or diffusion into Ti or a Ti alloy to be machined.

Accordingly, it is an object of the present invention to provide a material for effective, high speed machining of titanium or titanium alloys. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

The present invention may be described referring collectively to FIGS. 1–5. The machine tool material 10 of the present invention comprises a matrix material 12 and a reinforcing material 14. The matrix material 12 comprises a yttrium aluminum garnet, preferably $Y_3Al_5O_{12}$. The reinforcing material 14 is uniformly dispersed in the matrix material 12 and may comprise any one of a number of suitable reinforcing materials, including, for example, SiC, TiC, TiN, $TiB_2$, or combinations thereof. The identity of the particular reinforcing material utilized according to the present invention depends upon the design considerations associated with the application of the present invention at hand, the properties associated with a particular reinforcing material and the design preferences of those practicing the present invention.

Figure 1:
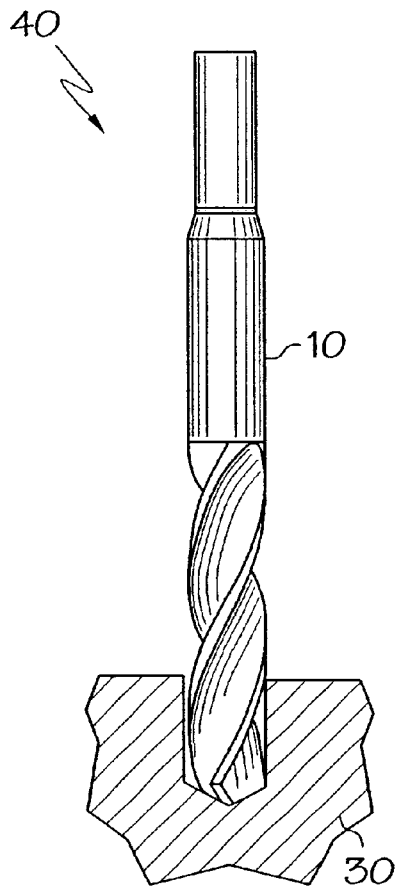
FIG. 1 is an illustration of a machine tool and workpiece according to one embodiment of the present invention.
Figure 2:
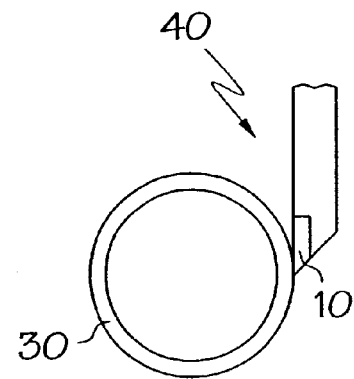
FIG. 2 is an illustration of a machine tool and workpiece according to another embodiment of the present invention.

The machine tool material 10 of the present invention may be used to form a variety of machine tools. For example, the machine tool material 10 may be used to form cutting tools or other types of machining elements, extrusion dies, drawing dies, or other types of dies, wear parts, etc. Two examples of typical machine tools 40 are illustrated in FIGS. 1 and 2. In FIG. 1, the machine tool 40 comprises a drill press and the machine tool material 10 is presented in the form of a drilling bit driven in rotary motion, relative to the workpiece 30. It is contemplated that the machine tool material of the present invention may merely be embedded at the tip of the machine tool 40. In FIG. 2, the machine tool 40 comprises a lathe and the machine tool material 10 is presented in the form of a cutting bit or tool bit insert held stationary as the workpiece 30 is rotated relative to the cutting bit. In any case, the machine tool 40 is typically configured to cause frictional engagement of a workpiece 30 and the machine tool material 10 of the machining element as the workpiece 30 and the machining element move relative to one another.

The matrix material 12 and the reinforcing material 14 are present in proportions selected such that the machine tool material is substantially resistant to transfer of impurities to Ti or a Ti alloy workpiece. Specifically, the machine tool material is resistant to chemical reaction with and diffusion into Ti or a Ti alloy. In this manner, the machine tool material 10 may be utilized in machining elements specially suited for machining Ti or Ti alloys 30. Primarily, it is preferable to select and present the matrix material 12 and the reinforcing material 14 in proportions such that the machine tool material 10 is resistant to chemical reaction with Ti or a Ti alloy. It is also preferable to select and present the matrix material 12 and the reinforcing material 14 in proportions such that the machine tool material 10 is resistant to the transfer of impurities through dissolution into Ti or a Ti alloy and is characterized by a low solubility in Ti or a Ti alloy.

Figure 4:
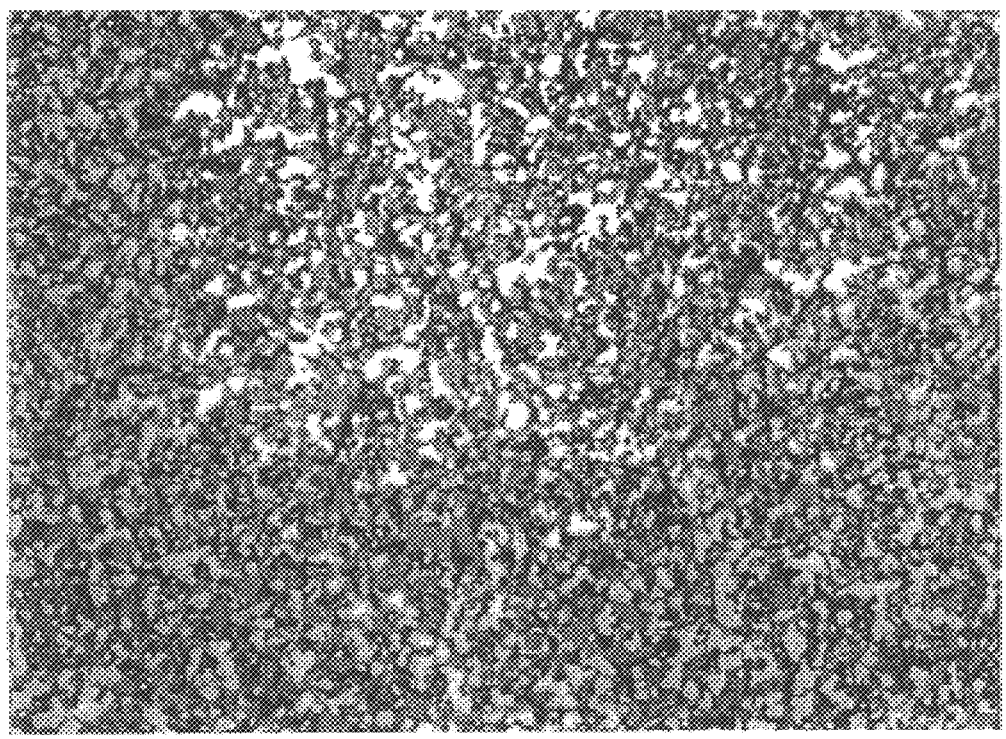
FIG. 4 illustrates an optical photomicrograph of a sample of a material according to the present invention.

The matrix material 12 and the reinforcing material 14 are present in proportions selected such that the machine tool material 10 defines a thermodynamically stable phase at temperatures up to about 1200° C. In this manner, a machining element according to the present invention may be used in high temperature, high machining rate applications without degradation of the physical and mechanical properties of the machine tool material 10. An example of the microstructure of such a material is shown in FIG. 4, where the light-colored material is TiC, the gray-colored material is $SiC_w$, and the dark-colored material is $Y_3Al_5O_{12}$.

Figure 3:
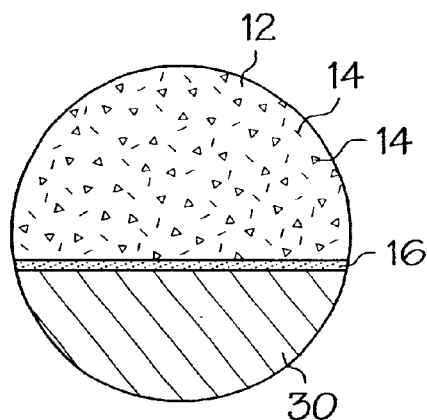
FIG. 3 is an illustration of a contact region of a machine tool and workpiece according to one embodiment of the present invention.

As is illustrated in FIG. 3, the matrix material 12 and the reinforcing material 14 may be selected and presented in proportions such that the machine tool material 10 tends to form a $Y_2O_3$ barrier layer 16 on the machine tool material 10 along a surface of frictional contact with a titanium or titanium alloy workpiece 30. The barrier layer 16 limits the transfer of impurities from the machine tool material 10 to the workpiece 30.

Figure 5:
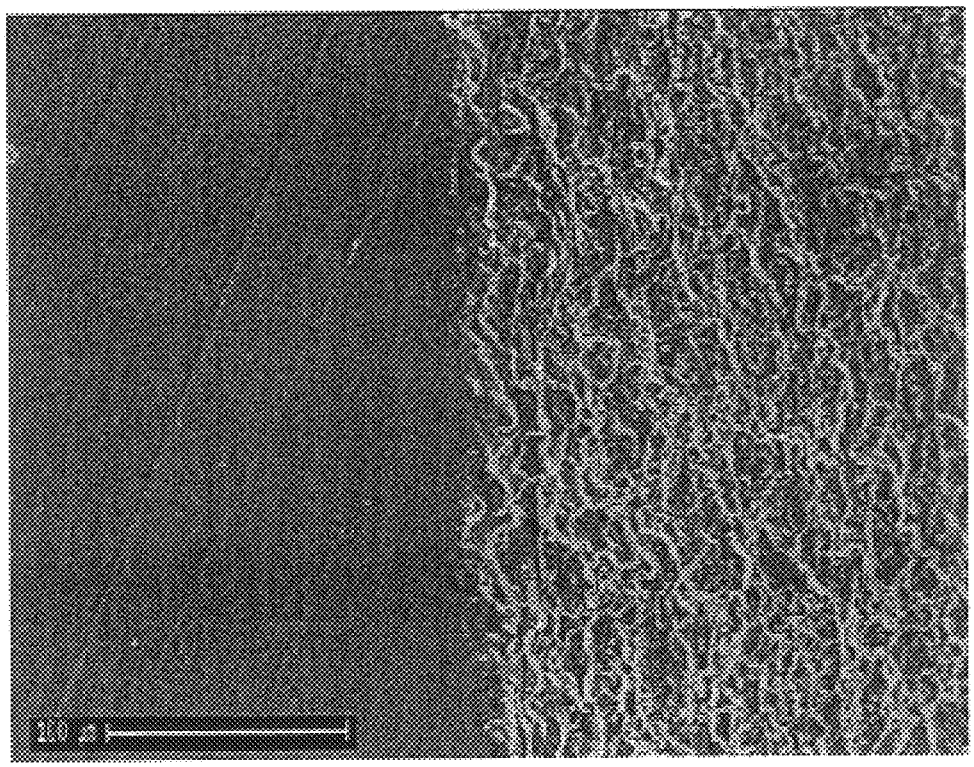
FIG. 5 illustrates a scanning electron micrograph of a surface of cutting tool material surface after EDM machining of the material.

Machining elements are commonly fabricated or manufactured through electrical discharge machining (EDM), a process where the material to be machined must be electrically conductive. Accordingly, to enable EDM of the machine tool material 10 of the present invention, the reinforcing material 14 is selected and presented in a proportion selected to enhance the characteristic electrical conductivity of the machine tool material 10 to enable electrical discharge machining of the machine tool material 10. The reinforcing material 14 is also typically selected and presented in an amount sufficient to enhance the hardness and fracture toughness of the matrix material 12. An example of the material after EDM machining is shown in FIG. 5, where the left side of the view illustrates the as-ground billet surface and the right side of the view illustrates the machined surface.

Improvements in conductivity, hardness, fracture toughness, phase stability, and resistance to transfer of impurities may be obtained by ensuring that the reinforcing material 14 defines a mean particle size of between about 1 $\mu$m and about 3 $\mu$m. More specifically, where the reinforcing material 14 comprises SiC, it preferably takes the form of an elongate whisker ($SiC_w$) defining a mean particle diameter of between about 1 $\mu$m and about 3 $\mu$m and an aspect ratio of about 10. For example, a reinforcing whisker according to the present invention may define a 2 $\mu$m diameter and a length of about 20 $\mu$m. It is also advantageous to utilize a matrix material 12 defining a mean particle size of less than about 2 $\mu$m. It is contemplated that fine particle sizes (mean particle size of about 1.8 $\mu$m) and narrow particle size distributions (where 90% of all particles are less than 3 $\mu$m and the largest particles are less than 8 $\mu$m) will be advantageous in practicing the present invention.

The reinforcing material 14 may be provided as a powder, as whiskers, or as is illustrated in FIG. 3, as a combination of both. The reinforcing material 14 may be uniformly dispersed in a matrix of $Y_3Al_5O_{12}$ powder. The composite may then be hot pressed at temperatures ranging from about 1400° C. to about 1800° C. to form the dense machine tool material 10 of the present invention. Alternatively or additionally, the composite may be sintered and subject to hot isostatic pressing at temperatures ranging from about 1400° C. to about 1800° C. to form the dense machine tool material 10 of the present invention. The density of the machine tool material 10 can be optimized by manipulating the hot pressing process parameters, including the heating rate, the final temperature, the residence time at the final temperature, and the pressure.

Preferably, the machine tool material 10 comprises at least about 30% and as much as about 60% yttrium aluminum garnet by volume. More specifically, the machine tool material 10 comprises between about 40% and about 45% yttrium aluminum garnet by volume. In a specific embodiment of the present invention, the reinforcing material comprises SiC whiskers ($SiC_w$) and TiC particles and the machine tool material 10 comprises, by volume, about 43% yttrium aluminum garnet, about 33% $SiC_w$, and about 24% TiC.

It is contemplated that the machine tool material of the present invention may be particularly advantageous in the machining of materials other than Ti or Ti alloys. For example, the machine tool material of the present invention may be utilized in the machining of Nickel-based alloys or ferrous alloys.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention

What is claimed is:

1. A machine tool material comprising a matrix material and a reinforcing material, wherein:
   said matrix material comprises a yttrium aluminum garnet;
   said reinforcing material is uniformly dispersed in said matrix material;
   said reinforcing material comprises SiC and TiC; and
   said matrix material and said reinforcing material are present in proportions selected such that said machine tool material is substantially resistant to transfer of impurities to Ti or a Ti alloy.

2. A machine tool material as claimed in claim 1 wherein said machine tool material comprises, by volume, about 43% yttrium aluminum garnet, about 33% $SiC_w$, and about 24% TiC.

3. A machine tool material as claimed in claim 1 wherein said machine tool material comprises between about 30% and about 60% yttrium aluminum garnet by volume.

4. A machine tool material as claimed in claim 1 wherein said machine tool material comprises less than about 60% yttrium aluminum garnet by volume.

5. A machine tool material comprising a matrix material and a reinforcing material, wherein:
   said matrix material comprises a yttrium aluminum garnet;
   said reinforcing material uniformly dispersed in said matrix material;
   said reinforcing material comprises $SiC_w$, TiC, TiN, $TiB_2$, or combinations thereof; and
   said matrix material and said reinforcing material are present in proportions selected such that said machine tool material is substantially resistant to transfer of impurities to Ti or a Ti alloy.

6. A machine tool material as claimed in claim 5 wherein said matrix material comprises $Y_3Al_5O_{12}$.

7. A machine tool material as claimed in claim 5 wherein said matrix material and said reinforcing material are present in proportions selected such that said machine tool material is resistant to chemical reaction with Ti or a Ti alloy.

8. A machine tool material as claimed in claim 5 wherein said matrix material and said reinforcing material are present in proportions selected such that said machine tool material is resistant to dissolution into Ti or a Ti alloy.

9. A machine tool material as claimed in claim 5 wherein said matrix material and said reinforcing material are present in proportions selected such that said machine tool material has a low solubility in Ti or a Ti alloy.

10. A machine tool material as claimed in claim 5 wherein said matrix material and said reinforcing material are present in proportions selected such that said machine tool material defines a thermodynamically stable phase at temperatures up to about 1200° C.

11. A machine tool material as claimed in claim 5 wherein said matrix material and said reinforcing material are present in proportions selected such that said machine tool material tends to form a $Y_2O_3$ barrier layer along a surface of frictional contact with a titanium workpiece.

12. A machine tool material as claimed in claim 5 wherein said machine tool material defines a characteristic electrical conductivity and said reinforcing material comprises a material present in a proportion selected to enhance said characteristic electrical conductivity of said machine tool material.

13. A machine tool material as claimed in claim 12 wherein said electrical conductivity enhancing reinforcing material is present in an amount sufficient to enable electrical discharge machining of said machine tool material.

14. A machine tool material as claimed in claim 5 wherein said reinforcing material is present in an amount sufficient to enhance the hardness of said matrix material.

15. A machine tool material as claimed in claim 5 wherein said reinforcing material is present in an amount sufficient to enhance the fracture toughness of said matrix material.

16. A machine tool material as claimed in claim 5 wherein said reinforcing material comprises a plurality of distinct components.

17. A machine tool material as claimed in claim 5 wherein said reinforcing material defines a mean particle size of less than about 2 $\mu$m.

18. A machine tool material as claimed in claim 5 wherein said matrix material defines a mean particle size of less than about 2 $\mu$m.

19. A machine tool material as claimed in claim 5 wherein said machine tool material comprises at least about 30% yttrium aluminum garnet by volume.

20. A machine tool material comprising a matrix material and a reinforcing material, wherein:
    said matrix material comprises a yttrium aluminum garnet;
    said reinforcing material is uniformly dispersed in said matrix material;
    said reinforcing material comprises an elongate whisker defining a mean particle diameter of between about 1 $\mu$m and about 3 $\mu$m and an aspect ratio of about 10; and
    said matrix material and said reinforcing material are present in proportions selected such that said machine tool material is substantially resistant to transfer of impurities to Ti or a Ti alloy.

21. A machine tool configured to cause frictional engagement of a workpiece and a workpiece machining element as said workpiece and said machining element move relative to one another, wherein:
    said workpiece machining element is formed of a machine tool material comprising a matrix material and a reinforcing material;
    said matrix material comprises a yttrium aluminum garnet;
    said reinforcing material is uniformly dispersed in said matrix material; and
    said matrix material and said reinforcing material are present in proportions selected such that said machine tool material is substantially resistant to transfer of impurities to Ti or a Ti alloy.

22. A machine tool material comprising a matrix material and a reinforcing material, wherein:
    said matrix material comprises a yttrium aluminum garnet;
    said reinforcing material is uniformly dispersed in said matrix material;
    said reinforcing material comprises SiC, $SiC_w$, TiC, TiN, $TiB_2$, or combinations thereof; and
    said matrix material and said reinforcing material are present in proportions selected such that said machine tool material is substantially resistant to transfer of impurities to a material to be machined.

23. A machine tool material as claimed in claim 22 wherein said material to be machined comprises a nickel-based alloy.

24. A machine tool material as claimed in claim 22 wherein said material to be machined comprises a ferrous alloy.

25. A machine tool material as claimed in claim 22 wherein said material to be machined comprises Ti or a Ti alloy.

* * * * *